United States Patent
Koers

(10) Patent No.: US 9,255,196 B2
(45) Date of Patent: *Feb. 9, 2016

(54) ACCELERATOR FOR CURING RESINS

(75) Inventor: Frederik Willem Karel Koers, Epse (NL)

(73) Assignee: AKZO NOBEL CHEMICALS INTERNATIONAL B.V., Amersfoort (NL)

( * ) Notice: Subject to any disclaimer, the term of this patent is extended or adjusted under 35 U.S.C. 154(b) by 0 days.

This patent is subject to a terminal disclaimer.

(21) Appl. No.: 14/005,697

(22) PCT Filed: Mar. 21, 2012

(86) PCT No.: PCT/EP2012/054932
§ 371 (c)(1),
(2), (4) Date: Sep. 17, 2013

(87) PCT Pub. No.: WO2012/126918
PCT Pub. Date: Sep. 27, 2012

(65) Prior Publication Data
US 2014/0005343 A1    Jan. 2, 2014

Related U.S. Application Data

(60) Provisional application No. 61/467,516, filed on Mar. 25, 2011.

(30) Foreign Application Priority Data

Mar. 24, 2011  (EP) .................................... 11159562

(51) Int. Cl.
| | | |
|---|---|---|
| *C08K 5/05* | (2006.01) | |
| *C08K 5/16* | (2006.01) | |
| *C08K 5/49* | (2006.01) | |
| *C08K 13/02* | (2006.01) | |
| *C08L 67/06* | (2006.01) | |
| *C08L 67/08* | (2006.01) | |
| *C08G 63/91* | (2006.01) | |
| *C08G 63/698* | (2006.01) | |
| *C08K 3/00* | (2006.01) | |
| *C08K 5/14* | (2006.01) | |
| *C08F 299/04* | (2006.01) | |
| *C08J 3/24* | (2006.01) | |
| *C08K 5/00* | (2006.01) | |

(52) U.S. Cl.
CPC ............... *C08K 13/02* (2013.01); *C08F 299/04* (2013.01); *C08J 3/241* (2013.01); *C08J 3/248* (2013.01); *C08K 3/0091* (2013.01); *C08K 5/0025* (2013.01); *C08K 5/0091* (2013.01); *C08K 5/05* (2013.01); *C08K 5/14* (2013.01); *C08K 5/16* (2013.01); *C08K 5/49* (2013.01)

(58) Field of Classification Search
CPC  C08F 299/04; C08G 63/6988; C08G 63/918; C08J 3/241; C08J 3/248; C08K 13/02; C08K 3/0091; C08K 5/0025; C08K 5/0091; C08K 5/05; C08K 5/14; C08K 5/16; C08K 5/49
USPC ............... 525/11, 17, 55, 242, 244, 263, 265, 525/273, 383, 387
See application file for complete search history.

(56) References Cited

U.S. PATENT DOCUMENTS

| | | | |
|---|---|---|---|
| 4,309,511 A * | 1/1982 | Jefferson et al. | 525/14 |
| 4,348,498 A * | 9/1982 | Kamio et al. | 525/13 |
| 4,524,177 A | 6/1985 | Klöker et al. | |
| 4,607,082 A * | 8/1986 | McGinniss | 525/286 |
| 2008/0207841 A1 | 8/2008 | Koers et al. | |
| 2010/0120977 A1 | 5/2010 | Koers et al. | |
| 2014/0005343 A1 * | 1/2014 | Koers | 525/445 |

FOREIGN PATENT DOCUMENTS

| | | | |
|---|---|---|---|
| EP | 0043484 A1 * | 1/1982 | |
| GB | 1 452 460 A | 10/1976 | |
| JP | S53-133288 A | 11/1978 | |
| JP | S57-044615 A | 3/1982 | |
| JP | 57-147509 A | 9/1982 | |
| WO | 90/12825 A1 | 11/1990 | |
| WO | WO 2006/090911 A1 | 8/2006 | |
| WO | WO 2006/128816 A1 | 12/2006 | |
| WO | 2008/003493 A1 | 1/2008 | |
| WO | 2008/003497 A1 | 1/2008 | |
| WO | WO 2008/003492 A1 | 1/2008 | |
| WO | WO 2008/003500 A1 | 1/2008 | |
| WO | WO 2008/003501 A1 | 1/2008 | |
| WO | WO 2008/003793 A1 | 1/2008 | |
| WO | WO 2008/119783 A1 | 10/2008 | |
| WO | WO 2008119783 A1 * | 10/2008 | |
| WO | WO 2011/083309 A1 | 7/2011 | |
| WO | 2011/157673 A1 | 12/2011 | |
| WO | 2014/032710 A1 | 3/2014 | |

OTHER PUBLICATIONS

English Machine translation of EP0043484.*
European Search Report dated Aug. 12, 2011 for related EP Application No. 11159562.5.
International Search Report and Written Opinion dated Jul. 24, 2012 for related PCT Application No. PCT/EP2012/054932.
English language abstract of JP 57-147509 A published Sep. 11, 1982.
Dibutyl phosphate data sheet, Sigma-Aldrich, retrieved Sep. 29, 2014. www.sigmaaldrich.com/catalog/product/aldrich/68572?lang=en&region=US.

(Continued)

*Primary Examiner* — Randy Gulakowski
*Assistant Examiner* — Christopher M Rodd
(74) *Attorney, Agent, or Firm* — Alice C. Su

(57) ABSTRACT

Accelerator solution suitable for forming a redox system with peroxides, comprising a Cu(I) compound, a transition metal selected from cobalt and titanium, a phosphorous-containing compound, a nitrogen-containing base, and a hydroxy-functional solvent.

8 Claims, No Drawings

(56) References Cited

OTHER PUBLICATIONS

Diethylene glycol monoethyl ether data sheet, Sigma-Aldrich, retrieved Sep. 29, 2014, www.sigmaaldrich.com/catalog/product/sial/537616?lang=en&region=US.

*N, N* Diethylacetoacetamide data sheet, Sigma-Aldrich, retrieved Sep. 29, 2014, www.sigmaaldrich.com/catalog/product/aldrich/690945?lang=en&region=US.

Stava et al; Properties of metallocene complexes during the oxidative crosslinking of air drying coatings; ScienceDirect; Journal of Physics and Chemistry of Solids 68 (2007) 799-802.

* cited by examiner

ACCELERATOR FOR CURING RESINS

This application is the U.S. National Phase of PCT/EP2012/054932 filed on Mar. 21, 2012 and claims the benefit of U.S. Provisional Application No. 61/467,516 filed on Mar. 25, 2011 and European Application No. 11159562.5 filed on Mar. 24, 2011, the contents of each of which are incorporated herein by reference.

The present invention relates to an accelerator solution suitable for forming a redox system with peroxides, a pre-accelerated resin composition comprising an unsaturated polyester resin or vinyl ester resin, and a two-component composition comprising said pre-accelerated resin composition.

Redox systems can be applied for resin curing. Conventional redox systems comprise an oxidizing agent (e.g. a peroxide) and a soluble transition metal ion as accelerator. The accelerator serves to increase the activity of the oxidizing agent at lower temperatures and, consequently, to speed up the curing rate.

Accelerator systems can be added to the resin to be cured in different ways. One method involves the addition of the individual accelerator ingredients to the resin, before the peroxide is added. This can be done just in advance of peroxide addition or days or weeks before that. In the latter case, we refer to a pre-accelerated resin composition, which comprises the resin and the accelerator ingredients and can be stored until further use and cure with the peroxide. Another method involves the pre-preparation of an accelerator solution containing the accelerator ingredients, which solution can be stored until further use and addition to the resin. A pre-accelerated resin can be prepared by either adding the individual ingredients of the accelerator system to the resin or by adding these ingredients in admixture in the form of an accelerator solution.

Typical accelerator systems comprise a transition metal salt or complex. The most frequently used transition metal for this purpose is cobalt. However, legislation requires reduction of the amount of cobalt in view its toxicity.

Many recent patent publications relate to Co-free accelerator systems. One such system can be found in WO 2008/119783, which discloses a system based on Cu, including Cu(I) and Cu(II).

It has now been found that the reactivity of such Cu-based systems can by improved by the combined use of Cu(I), a transition metal selected from cobalt and titanium, and a phosphorous-containing compound. Furthermore, it has been found that this combination enables the preparation of pre-accelerated resins with low gel-time drift. The gel-time drift reflects the shelf life stability of a pre-accelerated resin. Gel time drift is defined as a change in the resin's measured gel time compared to the original gel time measured at the time of its manufacture. Gel time drift is typically associated with a progressive increase in the resin's gel time and is attributed to the loss of the accelerator's activity over time.

The invention therefore relates to an accelerator solution suitable for forming a redox system with peroxides, comprising a Cu(I) compound, a transition metal selected from cobalt and titanium, a phosphorous-containing compound, a nitrogen-containing base, and a hydroxy-functional solvent.

Cobalt compounds can be used as second transition metal (reactivity booster) without resulting in legislative and toxicity problems because of the small amounts that can be used.

The invention also relates to a pre-accelerated resin composition comprising a Cu(I) compound, a transition metal selected from cobalt and titanium, a phosphorous-containing compound, a nitrogen-containing base, and a hydroxy-functional solvent.

The invention further relates to a two-component composition comprising a first component and a second component, the first component comprising the pre-accelerated resin composition as defined above, the second component comprising a peroxide.

Suitable Cu(I) compounds are Cu(I) halides, nitrate, sulphate, carboxylates, phosphate, and oxide. The most preferred Cu(I) compound is Cu(I) chloride.

The Cu(I) compound is preferably present in the accelerator solution, determined as metal, in an amount of at least 50 mmol/l, more preferably at least 100 mmol/l. It is preferably present in the accelerator solution in an amount of less than 5000 mmol/l, more preferably less than 2500 mmol/l, and most preferably less than 1000 mmol/l.

The Cu(I) compound is preferably present in a pre-accelerated resin, determined as metal, in an amount of at least 1 mmol/kg resin, more preferably at least 2 mmol/kg resin. It is preferably present in an amount of not more than 50 mmol/kg resin, more preferably not more than 25 mmol/kg resin, and most preferably not more than 10 mmol/kg resin.

In addition to the Cu(I) compound, the accelerator solution or the pre-accelerated resin contains another transition metal, selected from the group consisting of cobalt and titanium.

Cobalt can be added to the solution as cobalt naphthenate or octanoate (2-ethylhexanoate).

Titanium can be added to the solution as a titanium salt or complex. Examples of suitable salts or complexes are titanium isopropoxide, titanium bis(ammonium lactate) dihydroxide, titanium butoxide, titanium tert-butoxide, titanium butoxide, titanium chloride, titanium bromide, titanium diisopropoxide bis(acetylacetonate), titanium diisopropoxidebis(2,2,6,6-tetramethyl-3,5-heptanedionate), titanium ethoxide, titanium 2-ethylhexoyloxide, titanium methoxide, titanium oxyacetylacetonate, titanium phthalocyanine dichloride, titanium propoxide, titanium (tetraethanolaminato)isopropoxide, and titanyl phthalocyanine.

Any valency (II-IV) of titanium can be used.

Cobalt and titanium are preferably present in the accelerator solution, determined as metal, in an amount of at least 10 mmol/l, more preferably at least 25 mmol/l. It is preferably present in the accelerator solution in an amount of less than 1000 mmol/l, more preferably less than 500 mmol/l, and most preferably less than 250 mmol/l.

Cobalt and titanium are preferably present in a pre-accelerated resin, determined as metal, in an amount of at least 0.02 mmol/kg resin, more preferably at least 0.10 mmol/kg resin, even more preferably at least 0.25 mmol/kg resin, and most preferably 0.50 mmol/kg resin. It is preferably present in an amount of not more than 10 mmol/kg resin, more preferably not more than 5 mmol/kg resin, and most preferably not more than 2 mmol/kg resin.

The weight ratio (based on metal weight) of Cu(I):Ti and the weight ratio (based on metal weight) of Cu(I):Co preferably ranges from 3:1 to 200:1.

The phosphorous-containing compound is preferably an organic phosphorous-containing compound. More preferably, the organic phosphorous-containing compound is liquid a room temperature. Most preferably, it is a phosphorous-containing compound with the formula $P(R)_3$ or $P(R)_3=O$, wherein each R is independently selected from hydrogen, alkyl with 1 to 10 carbon atoms, and alkoxy groups with 1 to 10 carbon atoms. Preferably, at least two R-groups are selected from either alkyl groups of alkoxy groups. Specific examples of suitable phosphorous-containing compounds are diethyl phosphate, dibutyl phosphate, tributyl phosphate, triethyl phosphate (TEP), dibutyl phosphite, and triethyl phosphate.

Suitable nitrogen-containing bases to be present in the accelerator solution and the pre-accelerated resin are tertiary amines such as triethyl amine, dimethylaniline, diethylaniline, or N,N-dimethyl-p-toludine (DMPT), polyamines such as 1,2-(dimethyl amine)ethane, secondary amines such as diethyl amine, ethoxylated amines such as triethanol amine, dimethylamino ethanol, diethanol amine, or monoethanol amine, and aromatic amines such as bipyridine.

The nitrogen-containing base is preferably present in the accelerator solution in an amount of 5-50 wt %. In the pre-accelerator resin it is preferably present in an amount of 0.5-10 g/kg resin.

The term "hydroxy-functional solvent" includes compounds of the formula HO—(—$CH_2$—$C(R^1)_2$—$(CH_2)_m$—O—)$_n$—$R^2$, wherein each $R^1$ is independently selected from the group consisting of hydrogen, alkyl groups with 1-10 carbon atoms, and hydroxyalkyl groups with 1 to 10 carbon atoms, n=1-10, m=0 or 1, and $R^2$ is hydrogen or an alkyl group with 1-10 carbon atoms. Most preferably, each $R^1$ is independently selected from H, $CH_3$, and $CH_2OH$. Examples of suitable hydroxy-functional solvents are glycols like diethylene glycol monobutyl ether, ethylene glycol, diethylene glycol, dipropylene glycol, and polyethylene glycols, glycerol, and pentaerythritol.

The hydroxy-functional solvent is preferably present in the accelerator solution in an amount of 1-50 wt %, preferably 5-30 wt %. In the pre-accelerator resin it is preferably present in an amount of 0.1-100 g/kg resin, preferably 0.5-60 g/kg resin.

The accelerator solution and the pre-accelerated resin according to the present invention may optionally contain one or more promoters, water, reducing agents, additives, and/or fillers.

There are two important classes of promoters: metal carboxylate salts and 1,3-diketones.

Examples of 1,3-diketones are acetyl acetone, benzoyl acetone, and dibenzoyl methane, and acetoacetates such as diethyl acetoacetamide, dimethyl acetoacetamide, dipropylacetoacetamide, dibutylacetoacetamide, methyl acetoacetate, ethyl acetoacetate, propyl acetoacetate, and butylacetoacetate.

Examples of suitable metal carboxylate salts are the 2-ethyl hexanoates, octanoates, nonanoates, heptanoates, neodecanoates, and naphthenates of ammonium, alkali metals, and alkaline earth metals. A preferred alkali metal is K. The salts may be added to the accelerator solution or the resin as such, or they may be formed in situ. For example, alkali metal 2-ethyl hexanoates can be prepared in situ in the accelerator solution, after addition of the alkali metal hydroxide and 2-ethyl hexanoic acid to the solution.

Acetoacetates are particularly preferred promoters. Particularly preferred is diethyl acetoacetamide.

If one or more promoters is/are present in the accelerator solution, their amount preferably is at least 0.01 wt %, more preferably at least 0.1 wt %, even more preferably at least 1 wt %, more preferably at least 10 wt %, and most preferably at least 20 wt %; preferably not more than 90 wt %, more preferably not more than 80 wt %, and most preferably not more than 70 wt %, all based on the total weight of the accelerator solution.

The accelerator solution according to the present invention may further comprise additional organic compounds, such as aliphatic hydrocarbon solvents, aromatic hydrocarbon solvents, and solvents that carry an aldehyde, ketone, ether, ester, alcohol, phosphate, or carboxylic acid group. Examples of suitable solvents are aliphatic hydrocarbon solvents such as white spirit and odourless mineral spirit (OMS), aromatic hydrocarbon solvents such naphthenes and mixtures of naphthenes and paraffins, isobutanol; pentanol; 1,2-dioximes, N-methyl pyrrolidinone, N-ethyl pyrrolidinone; dimethyl formamide (DMF); dimethylsulfoxide (DMSO); 2,2,4-trimethylpentanediol diisobutyrate (TxIB); esters such as dibutyl maleate, dibutyl succinate, ethyl acetate, butyl acetate, mono- and diesters of ketoglutaric acid, pyruvates, and esters of ascorbic acid such as ascorbic palmitate; aldehydes; mono- and diesters, more in particular diethyl malonate and succinates; 1,2-diketones, in particular diacetyl and glyoxal; benzyl alcohol, and fatty alcohols.

The accelerator solution and the pre-accelerated resin may further contain a reducing agent. Examples of reducing agents are ascorbic acid, sodium formaldehyde sulphoxylate (SFS), reducing sugars like glucose and fructose, oxalic acid, phosphines, phosphites, organic or inorganic nitrites, organic or inorganic sulphites, organic or inorganic sulphides, mercaptanes, and aldehydes, and mixtures thereof. Ascorbic acid, which term in this specification includes L-ascorbic acid and D-isoascorbic acid, is the preferred reducing agent.

If a reducing agent is present in the accelerator solution, it is preferably present in an amount of more than 0.1 wt %, preferably at least 1 wt %, and most preferably at least 5%. It is preferably present in an amount of less than 30 wt %, more preferably less than 20 wt %, all based on the total weight of the accelerator solution.

The accelerator solution may optionally comprise water. If present, the water content of the solution preferably is at least 0.01 wt % and more preferably at least 0.1 wt %. The water content is preferably not more than 50 wt %, more preferably not more than 40 wt %, more preferably not more than 20 wt %, even more preferably not more than 10 wt %, and most preferably not more than 5 wt %, all based on the total weight of the accelerator solution.

The accelerator solution can be prepared by simply mixing the ingredients, optionally with intermediate heating and/or mixing steps.

The pre-accelerated resin can be prepared in various ways: by mixing the individual ingredients with the resin, or by mixing the resin, including optional monomer, with the accelerator solution according to the present invention. The latter method is preferred.

Suitable resins to be cured using the accelerator solution according to the invention and to be present in the pre-accelerated resin composition include alkyd resins, unsaturated polyester (UP) resins, vinyl ester resins, (meth)acrylate resins, polyurethanes, epoxy resins, and mixtures thereof. Preferred resins are (meth)acrylate resins, UP resins and vinyl ester resins. In the context of the present application, the terms "unsaturated polyester resin" and "UP resin" refer to the combination of unsaturated polyester resin and ethylenically unsaturated monomeric compound. The term "(meth) acrylate resin" refers to the combination of acrylate or methacrylate resin and ethylenically unsaturated monomeric compound. UP resins and acrylate resins as defined above are common practice and commercially available. Curing is generally started by either adding the accelerator solution according to the invention and the initiator (peroxide) to the resin, or by adding the peroxide to the pre-accelerated resin.

Suitable UP resins to be cured by the process of the present invention are so-called ortho-resins, iso-resins, iso-npg resins, and dicyclopentadiene (DCPD) resins. Examples of such resins are maleic, fumaric, allylic, vinylic, and epoxy-type resins, bisphenol A resins, terephthalic resins, and hybrid resins.

Vinyl ester resins include acrylate resins, based on, e.g. methacrylate, diacrylate, dimethacrylate, and oligomers thereof.

Acrylate resins include acrylates, methacrylates, diacrylates and dimethacrylates, and oligomers thereof.

Examples of ethylenically unsaturated monomeric compounds include styrene and styrene derivatives like α-methyl styrene, vinyl toluene, indene, divinyl benzene, vinyl pyrrolidone, vinyl siloxane, vinyl caprolactam, stilbene, but also diallyl phthalate, dibenzylidene acetone, allyl benzene, methyl methacrylate, methylacrylate, (meth)acrylic acid, diacrylates, dimethacrylates, acrylamides; vinyl acetate, triallyl cyanurate, triallyl isocyanurate, allyl compounds which are used for optical application (such as (di)ethylene glycol diallyl carbonate), chlorostyrene, tert-butyl styrene, tert-butylacrylate, butanediol dimethacrylate and mixtures thereof. Suitable examples of (meth)acrylates reactive diluents are PEG200 di(meth)acrylate, 1,4-butanediol di(meth)acrylate, 1,3-butanediol di(meth)acrylate, 2,3-butanedioldi(meth)acrylate, 1,6-hexanediol di(meth)acrylate and its isomers, diethyleneglycol di(meth)acrylate, triethyleneglycol di(meth)acrylate, glycerol di(meth)acrylate, trimethylolpropane di(meth)acrylate, neopentyl glycol di(meth)acrylate, dipropyleneglycol di(meth)acrylate, tripropyleneglycol di(meth)acrylate, PPG250 di(meth)acrylate, tricyclodecane dimethylol di(meth)acrylate, 1,10-decanediol di(meth)acrylate, tetraethylene glycol di(meth)acrylate, trimethylolpropanetri(meth)acrylate, glycidyl (meth)acrylate, (bis)maleimides, (bis)citraconimides, (bis)itaconimides, and mixtures thereof.

The amount of ethylenically unsaturated monomer in the pre-accelerated resin is preferably at least 0.1 wt %, based on the weight of the resin, more preferably at least 1 wt %, and most preferably at least 5 wt %. The amount of ethylenically unsaturated monomer is preferably not more than 50 wt %, more preferably not more than 40 wt %, and most preferably not more than 35 wt %.

If an accelerator solution is used for curing a resin or for preparing a pre-accelerated resin, the accelerator solution is generally employed in amounts of at least 0.01 wt %, preferably at least 0.1 wt %, and preferably not more than 5 wt %, more preferably not more than 3 wt % of the accelerator solution, based on the weight of the resin.

Peroxides suitable for curing the resin and suitable for being present in the second component of the two-component composition include inorganic peroxides and organic peroxides, such as conventionally used ketone peroxides, peroxyesters, diaryl peroxides, dialkyl peroxides, and peroxydicarbonates, but also peroxycarbonates, peroxyketals, hydroperoxides, diacyl peroxides, and hydrogen peroxide. Preferred peroxides are organic hydroperoxides, ketone peroxides, peroxyesters, and peroxycarbonates. Even more preferred are hydroperoxides and ketone peroxides. Preferred hydroperoxides include cumyl hydroperoxide, 1,1,3,3-tetramethylbutyl hydroperoxide, tert-butyl hydroperoxide, isopropylcumyl hydroperoxide, tert-amyl hydroperoxide, 2,5-dimethylhexyl-2,5-dihydroperoxide, pinane hydroperoxide, and pinene hydroperoxide. Preferred ketone peroxides include methyl ethyl ketone peroxide, methyl isopropyl ketone peroxide, methyl isobutyl ketone peroxide, cyclohexanone peroxide, and acetylacetone peroxide.

Of course, also mixtures of two or more peroxides can be used; for instance a combination of a hydroperoxide or ketone peroxide with a peroxyester.

A particularly preferred peroxide is methyl ethyl ketone peroxide. The skilled person will understand that these peroxides can be combined with conventional additives, for instance fillers, piments, and phlegmatisers. Examples phlegmatizers are hydrophilic esters and hydrocarbon solvents. The amount of peroxide to be used for curing the resin is preferably at least 0.1 per hundred resin (phr), more preferably at least 0.5 phr, and most preferably at least 1 phr. The amount of peroxide is preferably not more than 8 phr, more preferably not more than 5 phr, most preferably not more than 2 phr.

When the peroxide is mixed with the pre-accelerated resin, it is added to a pre-mix of resin and accelerator solution, or is pre-mixed with the resin after which accelerator solution is added. The resulting mixture is mixed and dispersed. The curing process can be carried out at any temperature from −15° C. up to 250° C., depending on the initiator system, the accelerator system, the compounds to adapt the curing rate, and the resin composition to be cured. Preferably, it is carried out at ambient temperatures commonly used in applications such as hand lay-up, spray-up, filament winding, resin transfer moulding, coating (e.g. gelcoat and standard coatings), button production, centrifugal casting, corrugated sheets or flat panels, relining systems, kitchen sinks via pouring compounds, etc. However, it can also be used in SMC, BMC, pultrusion techniques, and the like, for which temperatures up to 180° C., more preferably up to 150° C., most preferably up to 100° C., are used.

Other optional additives may be employed in the curing process according to the invention, such as fillers, glass fibres, pigments, inhibitors, and promoters.

The cured resins find use in various applications, including marine applications, chemical anchoring, roofing, construction, relining, pipes and tanks, flooring, windmill blades, etc.

EXAMPLES

Example 1

Two Cu(I)-containing accelerator solutions were prepared, the difference being a small amount of Co. The Co was added by adding 0.045 wt % (based on the weight of the accelerator solution) of the commercially available Accelerator NL-53 (ex-AkzoNobel), comprising cobalt (II) 2-ethylhexanoate in an amount of 10 wt % Co (as metal), The ingredients of the solutions are listed in Table 1.

These accelerator solutions—0.5 phr (per hundred resin)—were used to cure an ortho phthalic acid-based unsaturated polyester resin (Palatal® P6 ex DSM resin) at 20° C. with 1.5 phr methyl ethyl ketone peroxide (Butanox® M50, ex-AkzoNobel). The curing performance was analysed by the method of the Society of Plastic Institute (SPI method F/77.1; available from Akzo Nobel Polymer Chemicals). This method involves measuring the peak exotherm, the time to peak, and the gel time. According to this method, 25 g of a mixture comprising 100 parts of resin, 1.5 parts of peroxide, and 0.5 parts of accelerator solution were poured into a test tube and a thermocouple was placed through the enclosure at the centre of the tube. The glass tube was then placed in a climate controlled room maintained at 20° C. and the time-temperature curve was measured. From the curve the following parameters were calculated:

Gel time (Gt)=time in minutes elapsed between the start of the experiment and 5.6° C. above the bath temperature.

Time to peak (TTP)=time elapsed between the start of the experiment and the moment that the peak temperature is reached.

Peak exotherm (PE)=the maximum temperature that is reached.

The results are displayed in Table 1, which also includes a reference experiment using only Accelerator NL-53 (0.045 phr).

TABLE 1

|  | Comp. exp. 1 | Comp. exp. 2 | Exp. 3 |
| --- | --- | --- | --- |
| Diethylene glycol (wt %) | — | 20 | 19.95 |
| Diethanol amine (wt %) | — | 25 | 25 |
| Diethyl acetoacetamide (wt %) | — | 40 | 40 |
| Dibutyl phosphate (wt %) | — | 10 | 10 |
| Cu(I) chloride (wt %) | — | 5 | 5 |
| Accelerator NL-53 (wt %) | 100 | — | 0.045 |
| Gt (min) | 18 | 21 | 3 |
| TTP (min) | 32 | 42 | 8 |
| PE (° C.) | 152.3 | 153.4 | 151.9 |

Example 2

100 phr Palatal® P6 was pre-accelerated with 1 phr of the accelerator solution of Experiment 2 additionally containing 0.03 wt % Ti(IV)isopropoxide.

The gel time of the pre-accelerated resin was monitored for 8 weeks by SPI measurements—as explained above—using 10 g of resin and 2 phr methyl isopropyl ketone peroxide (Butanox® P50, ex-AkzoNobel). As shown in Table 2 below, no or only minor gel time drift was observed.

TABLE 2

| Time (weeks) | Get (min) |
| --- | --- |
| 0 (start) | 4.9 |
| 1 | 5.0 |
| 2 | 5.1 |
| 4 | 4.8 |
| 8 | 5.5 |

The invention claimed is:

1. Accelerator solution suitable for forming a redox system with peroxides, comprising a Cu(I) compound, a titanium salt or complex, a phosphorous-containing compound, a nitrogen-containing base, and a hydroxy-functional solvent wherein the weight ratio, based on metal weight, of the Cu(I) compound to the titanium salt or complex is in the range of 3:1 to 200:1.

2. Accelerator solution according to claim 1 wherein the phosphorous-containing compound is a dialkyl phosphate.

3. Accelerator solution according to claim 1 further comprising an alkali or alkaline earth metal compound and/or a 1,3-diketone.

4. Pre-accelerated resin composition comprising a curable resin, a Cu(I) compound, a titanium salt or complex, a phosphorous-containing compound, a nitrogen-containing base, and a hydroxy-functional solvent wherein the weight ratio, based on metal weight, of the Cu(I) compound to the titanium salt or complex is in the range of 3:1 to 200:1.

5. Pre-accelerated resin composition according to claim 4 wherein the phosphorous-containing compound is a dialkyl phosphate.

6. Pre-accelerated resin composition according to claim 4 further comprising an alkali or alkaline earth metal compound and/or a 1,3-diketone.

7. Two-component composition comprising a first component and a second component, the first component comprising the pre-accelerated resin composition according to claim 4, the second component comprising a peroxide.

8. Two component composition according to claim 7 wherein the peroxide is selected from the group consisting of organic hydroperoxides, ketone peroxides, peroxycarbonates, and peroxyesters.

* * * * *